United States Patent
Tooch

(10) Patent No.: US 9,442,572 B2
(45) Date of Patent: Sep. 13, 2016

(54) 5-KEY DATA ENTRY SYSTEM AND ACCOMPANYING INTERFACE

(71) Applicant: Peter James Tooch, Thousand Oaks, CA (US)

(72) Inventor: Peter James Tooch, Thousand Oaks, CA (US)

( * ) Notice: Subject to any disclaimer, the term of this patent is extended or adjusted under 35 U.S.C. 154(b) by 7 days.

(21) Appl. No.: 13/842,962

(22) Filed: Mar. 15, 2013

(65) Prior Publication Data

US 2014/0282202 A1    Sep. 18, 2014

(51) Int. Cl.
| | | |
|---|---|---|
| *G06F 15/02* | (2006.01) | |
| *G06F 3/02* | (2006.01) | |
| *G06F 3/023* | (2006.01) | |
| *G06F 3/0488* | (2013.01) | |

(52) U.S. Cl.
CPC ........... *G06F 3/0202* (2013.01); *G06F 3/0205* (2013.01); *G06F 3/0236* (2013.01); *G06F 3/04886* (2013.01); *G06F 15/02* (2013.01)

(58) Field of Classification Search
CPC ...................................................... G06F 15/02
USPC ........................................................ 715/212
See application file for complete search history.

(56) References Cited

U.S. PATENT DOCUMENTS

| | | | |
|---|---|---|---|
| 5,982,303 A | 11/1999 | Smith | |
| 6,016,142 A | 1/2000 | Chang et al. | |
| 6,037,942 A * | 3/2000 | Millington | 715/835 |
| 6,144,378 A | 11/2000 | Lee | |
| 6,847,706 B2 | 1/2005 | Bozorgui-Nesbat | |
| 6,897,849 B2 | 5/2005 | Kim | |
| 6,992,658 B2 | 1/2006 | Wu et al. | |
| 7,084,858 B2 | 8/2006 | Anson | |
| 7,629,966 B2 | 12/2009 | Anson | |
| 7,856,603 B2 | 12/2010 | Molgaard | |
| 7,868,787 B2 | 1/2011 | Chung et al. | |
| 2003/0017858 A1 * | 1/2003 | Kraft et al. | 455/566 |
| 2003/0117374 A1 * | 6/2003 | McCloud | 345/168 |
| 2008/0266262 A1 * | 10/2008 | Duarte et al. | 345/169 |
| 2010/0060606 A1 | 3/2010 | Anson | |
| 2011/0141027 A1 | 6/2011 | Ghassabian | |
| 2011/0320974 A1 | 12/2011 | Bai et al. | |
| 2012/0176310 A1 * | 7/2012 | Nair | 345/157 |

FOREIGN PATENT DOCUMENTS

KR    1020100129443    12/2010

* cited by examiner

*Primary Examiner* — Kavita Padmanabhan
*Assistant Examiner* — Tionna Burke
(74) *Attorney, Agent, or Firm* — Koppel, Patrick, Heybl & Philpott

(57) ABSTRACT

A data entry system is disclosed. Some embodiments of the data entry system utilize an input device and a user interface. In some embodiments, a user can actuate keys on an input device to activate and/or select from the user interface cells associated with symbols, such as letters. A user can input different symbols quickly and efficiently. In some embodiments, users can input the most common letters of a given alphabet using only a single actuation of one of four keys.

22 Claims, 8 Drawing Sheets

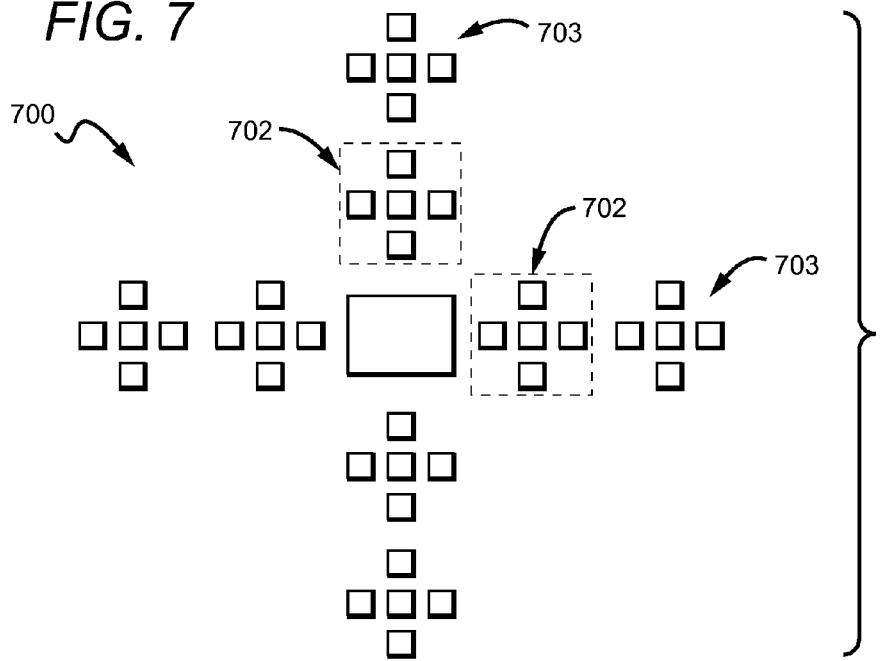
FIG. 7
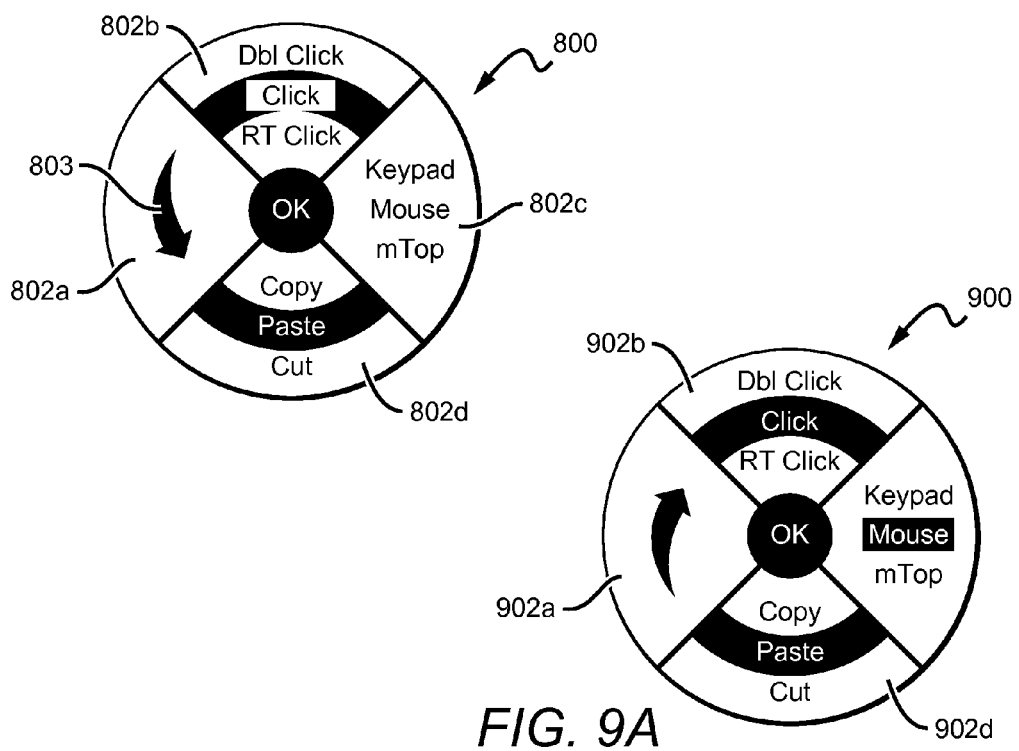
FIG. 8
FIG. 9A

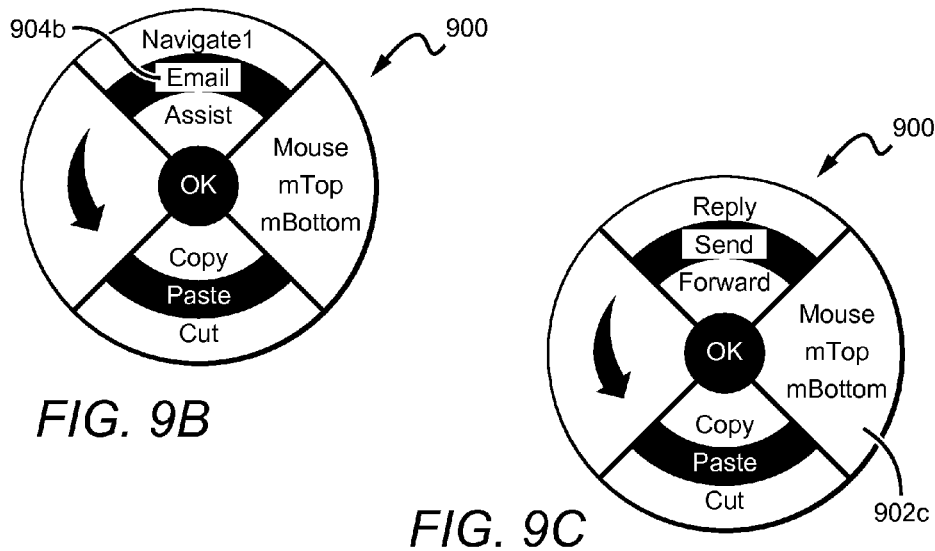
FIG. 9B
FIG. 9C
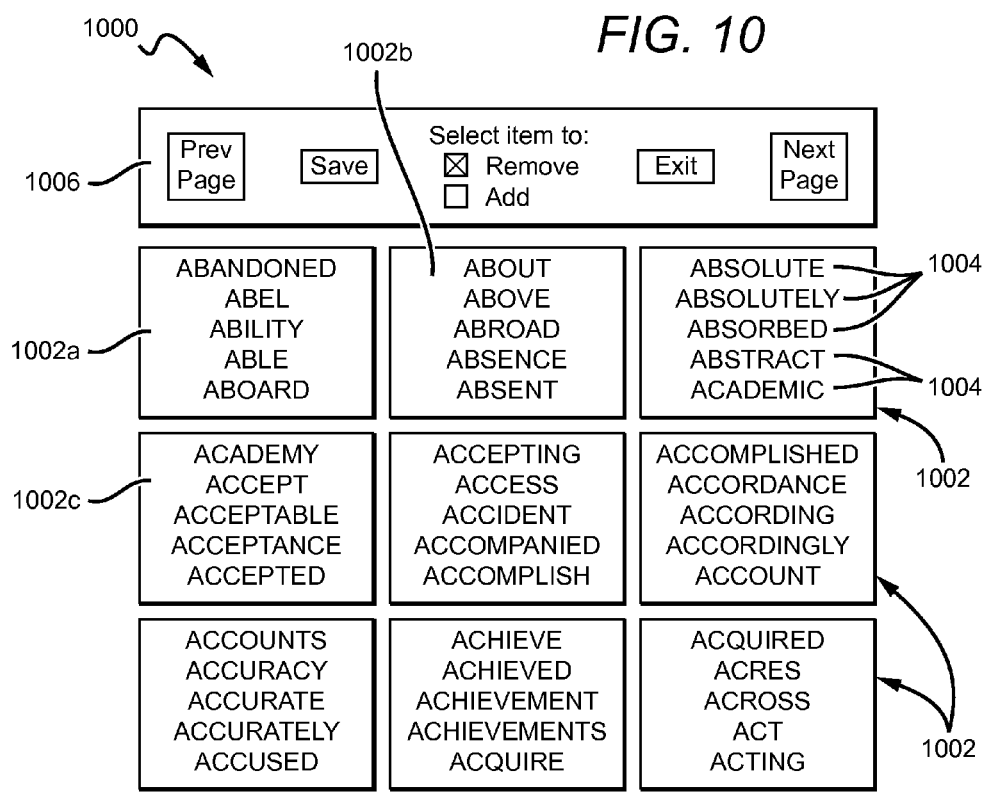
FIG. 10

| Letter | Count | Letter | Frequency |
|---|---|---|---|
| E | 21912 | E | 12.02 |
| T | 16587 | T | 9.10 |
| A | 14810 | A | 8.12 |
| O | 14003 | O | 7.68 |
| I | 13318 | I | 7.31 |
| N | 12666 | N | 6.95 |
| S | 11450 | S | 6.28 |
| R | 10977 | R | 6.02 |
| H | 10795 | H | 5.92 |
| D | 7874 | D | 4.32 |
| L | 7253 | L | 3.98 |
| U | 5246 | U | 2.88 |
| C | 4943 | C | 2.71 |
| M | 4761 | M | 2.61 |
| F | 4200 | F | 2.30 |
| Y | 3853 | Y | 2.11 |
| W | 3819 | W | 2.09 |
| G | 3693 | G | 2.03 |
| P | 3316 | P | 1.82 |
| B | 2715 | B | 1.49 |
| V | 2019 | V | 1.11 |
| K | 1257 | K | 0.69 |
| X | 315 | X | 0.17 |
| Q | 205 | Q | 0.11 |
| J | 198 | J | 0.10 |
| Z | 128 | Z | 0.07 |

FIG. 14
PRIOR ART

| Letter | French | German | Spanish | Portuguese | Esperanto | Italian | Turkish | Swedish | Polish | Dutch |
|---|---|---|---|---|---|---|---|---|---|---|
| a | 7.636% | 6.51% | 12.53% | 14.63% | 12.12% | 11.74% | 11.68% | 9.3% | 8.0% | 7.49% |
| b | 0.901% | 1.89% | 1.42% | 1.04% | 0.98% | 0.92% | 2.95% | 1.3% | 1.3% | 1.58% |
| c | 3.260% | 3.06% | 4.68% | 3.88% | 0.78% | 4.5% | 0.97% | 1.3% | 3.8% | 1.24% |
| d | 3.669% | 5.08% | 5.86% | 4.99% | 3.04% | 3.73% | 4.87% | 4.5% | 3.0% | 5.93% |
| e | 14.715% | 17.40% | 13.68% | 12.57% | 8.99% | 11.79% | 9.01% | 9.9% | 6.9% | 18.81% |
| f | 1.066% | 1.66% | 0.69% | 1.02% | 1.03% | 0.95% | 0.44% | 2.0% | 0.1% | 0.81 |
| g | 0.866% | 3.01% | 1.01% | 1.30% | 1.17% | 1.64% | 1.34% | 3.3% | 1.0% | 3.40% |
| h | 0.737% | 4.76% | 0.70% | 1.28% | 0.38% | 1.54% | 1.14% | 2.1% | 1.0% | 2.38% |
| i | 7.529% | 7.55% | 6.25% | 6.18% | 10.01% | 11.28% | 8.27% | 5.1% | 7.0% | 6.50% |
| j | 0.545% | 0.27% | 0.44% | 0.40% | 3.50% | 0 | 0.01% | 0.7% | 1.9% | 1.46% |
| k | 0.049% | 1.21% | 0.01% | 0.02% | 4.16% | 0 | 4.71% | 3.2% | 2.7% | 2.25% |
| l | 5.456% | 3.44% | 4.97% | 2.78% | 6.14% | 6.51% | 5.75% | 5.2% | 3.1% | 3.57% |
| m | 2.968% | 2.53% | 3.15% | 4.74% | 2.99% | 2.51% | 3.74% | 3.5% | 2.4% | 2.21% |
| n | 7.095% | 9.78% | 6.71% | 5.05% | 7.96% | 6.88% | 7.23% | 8.8% | 4.7% | 10.03% |
| o | 5.378% | 2.51% | 8.68% | 10.73% | 8.78% | 9.83% | 2.45% | 4.1% | 7.1% | 6.06% |
| p | 3.021% | 0.79% | 2.51% | 2.52% | 2.74% | 3.05% | 0.79% | 1.7% | 2.4% | 1.57% |
| q | 1.362% | 0.02% | 0.88% | 1.20% | 0 | 0.51% | 0 | 0.007% | - | 0.009% |
| r | 6.553% | 7.00% | 6.87% | 6.53% | 5.91% | 6.37% | 6.95% | 8.3% | 3.5% | 6.41% |
| s | 7.948% | 7.27% | 7.98% | 7.81% | 6.09% | 4.98% | 2.95% | 6.3% | 3.8% | 3.73% |
| t | 7.244% | 6.15% | 4.63% | 4.74% | 5.27% | 5.62% | 3.09% | 8.7% | 2.4% | 6.79% |
| u | 6.311% | 4.35% | 3.93% | 4.63% | 3.18% | 3.01% | 3.43% | 1.8% | 1.8% | 1.99% |
| v | 1.628% | 0.67% | 0.90% | 1.67% | 1.90% | 2.10% | 0.98% | 2.4% | - | 2.85% |
| w | 0.114% | 1.89% | 0.02% | 0.01% | 0 | 0 | 0 | 0.03% | 3.6% | 1.52% |
| x | 0.387% | 0.03% | 0.22% | 0.21% | 0 | 0 | 0 | 0.1% | - | 0.04% |
| y | 0.308% | 0.04% | 0.90% | 0.01% | 0 | 0 | 3.37% | 0.6% | 3.2% | 0.035% |
| z | 0.136% | 1.13% | 0.52% | 0.47% | 0.50% | 0.49% | 1.50% | 0.02% | 5.1% | 1.39% |

# 5-KEY DATA ENTRY SYSTEM AND ACCOMPANYING INTERFACE

BACKGROUND OF THE INVENTION

1. Field of the Invention

The invention relates generally to the input of symbols, such as letters and numbers, into a user interface.

2. Description of the Related Art

Methods and devices for inputting symbols into a user interface (UI) are well known and ubiquitous in society. Examples of such input systems include the use of QWERTY keyboards with personal computers, television remote controls with televisions, number pads with mobile phones, and displayed keys on touch-screen devices, to name a few. The first three above examples are systems utilizing separate input and display devices, whereas touch-screen devices utilize a single device (the screen) to serve as both the input device and the display device. Further, display devices are in some instances not necessary, as it is possible for data to be entered but not displayed.

Current methods and devices for inputting symbols into a UI are often tedious, time-consuming, complicated, and/or generally undesirable. While prevalent in society, the organization of the QWERTY keyboard is confusing and, to most people, illogical. Further, as is also the case with many touch-screen devices which show a keyboard, a QWERTY keyboard has a myriad of different keys which can be pressed, often including over 100 different keys and over 300 key combinations.

On the other end of the spectrum, television data entry systems often include a limited number of keys that can actually be pressed. A common keyboard layout on a television display is also fairly logical, as it is organized in alphabetical rows as shown in FIG. 11. However, attempting to enter data using this system is very tedious and time-consuming. A user must use keys to navigate the display keyboard, and often times must press one or more keys six, seven, or even more times in order to input a desired letter. For example and with respect to FIG. 11, for a user to enter the letter "T" after entering the letter "A", both of which are very common letters, a user must press the "right" key five times, the "down" key twice, and the "enter" key once, for a total of eight key entries.

Many have studied the frequency with which letters appear in the English language. Although studies differ slightly, results from a reputable study by the University of Cornell are shown in FIGS. 12 and 13. As can be seen, the letter "E" has a frequency almost three percentage points greater than any other letter. The next eight letters ("T", "A", "O", "I", "N", "S", "R", and "H") are all within about three percentage points of frequency of one another; after "H", the next letter "D" is about 1.5 percentage points of frequency lower. The frequency with which English alphabet letters appear in a variety of other Latin languages is shown in FIG. 14. At least one study has also shown that a "space" is more common than the letter "E".

SUMMARY OF THE INVENTION

Briefly, and in general terms, the invention is directed to data entry systems and methods. In some embodiments, an input device and a user interface are used to input data.

One embodiment of a method of entering data according to the present invention is as follows. A single-click or double-click is received, and one of a plurality of cells is activated in response to the user input. The cells are associated with one of a plurality of matrices. The cells and the matrices are associated with one of a plurality of keys.

One embodiment of a system for accepting data entry according to the present invention is as follows. A system includes a data entry device with a plurality of keys, each associated with a matrix having cells, each of which is associated with a symbol. The system also includes a processor for receiving data.

One embodiment of a system for entering symbols includes a data entry device with keys, and a user interface comprising cells associated with a symbol. Eight of the symbols can be selected using a single-click or double-click of one of the keys.

BRIEF DESCRIPTION OF THE DRAWINGS

FIG. 7 is another embodiment of a user interface according to the present invention.

FIG. 8 is another embodiment of a user interface according to the present invention.

FIG. 9A-9C are another embodiment of a user interface according to the present invention.

FIG. 10 is an embodiment of another user interface according to the present invention.

FIG. 14 is a chart showing letter frequency in various languages.

DETAILED DESCRIPTION OF THE INVENTION

Figure 1:
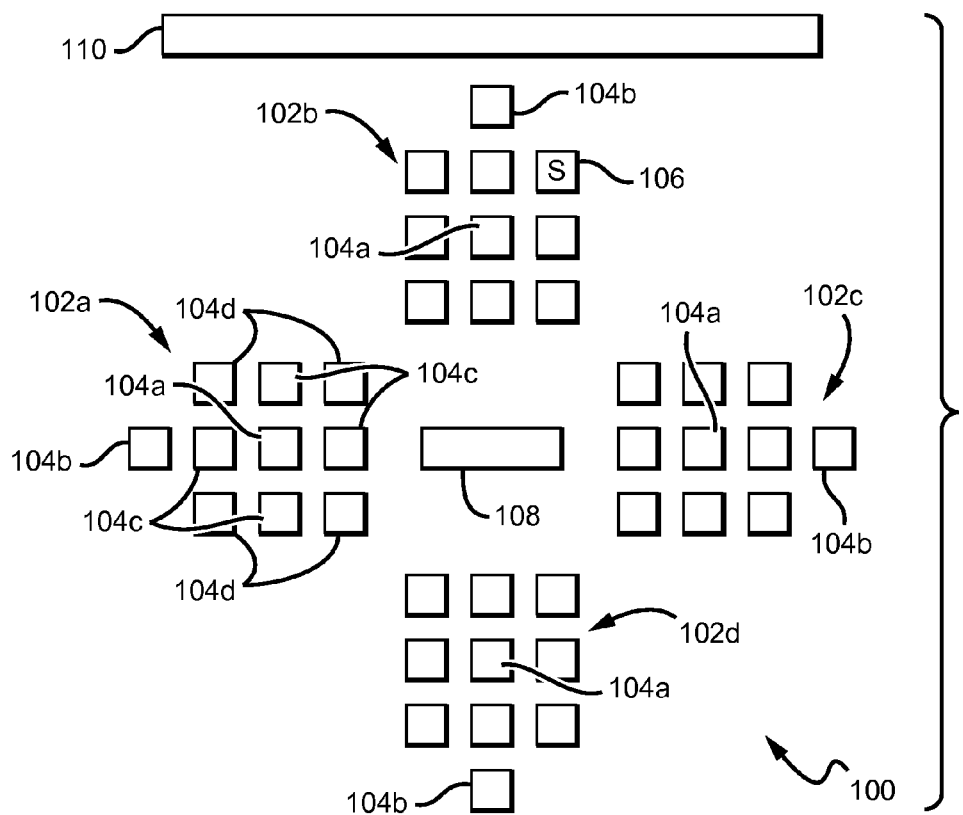
FIG. 1 is an embodiment of a user interface according to the present invention.

Presented herein is a novel User Interface (UI) for inputting symbols using an input device. This novel UI can be used in conjunction with various devices including televisions, personal computers, mobile telephones, PDA-type devices, touch-screen devices, and many other types of devices to simply, quickly, and accurately type information or commands into or sent to a device such as one of those listed above, which can include a processor to receive the information or commands. In one embodiment, the input device is a "thumb device" in that proficient users will quickly type information that is transferred to the UI on a limited number of keys on an input device using a single finger, such as a thumb, similar to the manner in which a typical person uses a television remote control. Embodiments of the present invention can also include a processor for receiving a user input. However, nothing herein is intended to limit data entry to the use of a single finger or even fingers in general, as many other input methods are possible.

It is understood that when an element is referred to as being "on" another element, it can be directly on the other element or intervening elements may also be present. Furthermore, relative terms such as "inner", "outer", "upper", "above", "lower", "beneath", "below", "faster", "slower", and similar terms, may be used herein to describe a relationship of one element to another. Terms such as "higher", "lower", "wider", "narrower", "corner", "diagonal", and similar terms, may be used herein to describe angular relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention. The below embodiments are discussed generally with reference to the English language, although the concepts contained herein can be applied to any language or communication system. Further, while upper-case letters are often used in examples, any examples using upper-case letters could be applied to lower-case letters or a combination of the two.

As used herein, the term "actuation" is intended to include many different possible combinations of actuation types. As an example, if "single-clicks" and "double-clicks" are the two possible types of actuation of an embodiment of the invention, and a cell can be highlighted by "an actuation," then in one embodiment the cell can be highlighted by a single-click, in a second embodiment the cell can be highlighted by a double-click, and in a third embodiment the cell can be highlighted by a single-click or a double-click.

Embodiments of the invention are described herein with reference to view illustrations that are schematic illustrations. Thus, the elements illustrated in the figures are schematic in nature and their shapes and sizes are not intended to illustrate the precise shape or size of a region and are not intended to limit the scope of the invention.

FIG. 1 shows a user interface 100 according to one embodiment of the present invention. In one embodiment the user interface 100 is visible to a user of the invention, although that is not always necessary; for example, embodiments of the current invention can be used by the visually impaired. Similar to a QWERTY keyboard, a user can become familiar with a user interface according to the present invention, such as through continued use, such that a visual display is not necessary. The user interface 100 comprises four matrices 102, although other embodiments may comprise fewer or more matrices. Each matrix 102 can be associated with a direction; for example, the matrix 102a is associated with the direction left. In other embodiments the matrices are not associated with a direction, but could, for example, be associated with a relative placement (top, second from top, etc.) or not associated with a placement at all.

Each matrix 102 comprises ten cells 104, although in other embodiments matrices can comprise fewer or more than ten cells, such as matrices comprising nine cells. In the embodiment shown, each matrix 102 comprises a center cell 104a, an end cell 104b, and eight subordinate cells 104c and 104d (labeled only in the matrix 102a), with the four first subordinate cells 104c directly above, below, left, or right of the center cell 104a and the four second subordinate cells 104d diagonal from the center cell 104a in each matrix 102.

In one embodiment, the center cells 104a, the end cells 104b, the first subordinate cells 104c, and the second subordinate cells 104d can be ranked in order of desirability, and more common symbols (which a user typically desires to be more accessible than less common symbols) can be placed in the higher ranked cells.

The cells 104 are organized in a "3×3+1" layout as shown in FIG. 1. In this layout, each matrix has nine cells in a 3×3 layout, with an additional end cell on the same end of the matrix as the direction with which the matrix is associated. For example, in the matrix 102a, which is associated with the direction left, the end cell 104b is on the left of the three by three matrix. The center cells 104a are in the center of each three by three section of the 3×3+1 matrices 102, the subordinate cells 104c are directly above, below, left, or right of the center cells 104a, and the subordinate cells 104d are diagonal from the center cells 104a. Each of the end cells 104b and subordinate cells 104c,104d can be associated with a directional position within the matrix 104. For example, the subordinate cells 104c shown in FIG. 1 above the center cells 104a are associated with the direction "up." In a typical embodiment an end cell 104b is associated with the same direction as the matrix 102 in which the cell resides. In one embodiment the center cells 104a are not associated with a direction, and in another embodiment the center cells 104a are associated with a "center" position or direction.

Each cell 104 can contain a symbol 106 with which it is associated. Symbol as used herein can include a letter, a combination of letters (e.g. "th", "ll", etc.), a number, a numeral, another type of non-alphabetic character (e.g. "!", "?", ",", ";", "-", etc.), a space, non-English letters such as "ñ" and " ", a tab, functions (e.g. backspace, page up, shift, caps lock, etc.), or other symbols. This list is not meant to be limiting, and various different symbols can be used; any button on a standard QWERTY keyboard, for example, can be included as a symbol. While embodiments of the present invention are described herein with reference to English language symbols, the present invention can be applied to other symbol sets, including but not limited to Latin and non-Latin languages.

The user interface 100 also includes a word builder 108. Selected symbols 106 from the cells 104 can be input into the word builder 108. Some functional symbols, such as "backspace", can also be input into the word builder 108. For example, if the functional symbol "backspace" is input, then the last symbol entered into the word builder 108 before "backspace" will be deleted. Other functional symbols can affect the next symbol input into the word builder 108. For example, in one embodiment, if the functional symbol "shift" is input, then the next symbol input will be capitalized.

Figure 2:
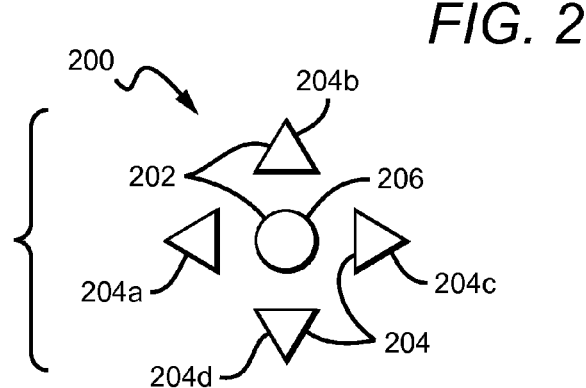
FIG. 2 is an embodiment of a data input layout according to an embodiment of the present invention.

Symbols 106 can be entered into the word builder 108 using a number of different methods. In one embodiment, an input device is used. FIG. 2 shows one embodiment of a key layout 200 which can be present on a data entry or input device according to embodiments of the present invention. The key layout 200 comprises five keys 202. Certain other embodiments comprise more or fewer than five keys. For example, one embodiment comprises four keys, while another embodiment comprises seven keys, and yet another embodiment comprises nine keys. Although other embodiments comprise keys that are not directional, the four keys 204 are directional keys. Each of the directional keys can be associated with a direction; for example, the key 204a is associated with the direction left. The key layout 200 also has an entry key 206 which is not associated with a direction, or is associated with a "center" position or direction, although in other embodiments it can be associated with a direction. The term entry key is used only for identification purposes, and is not intended to mean that the entry key 206 is always used solely for entry. In some embodiments the entry key 206 is used solely for data entry. In some embodiments the entry key 206 is not used for data entry. In one embodiment, the entry key 206 is used both for data entry and for other tasks.

The key layout 200, which comprises the five keys 202, can take many forms. By way of example only and in no way limiting, the five keys 202 could be five keys on a television remote controller, five keys on a computer or other keyboard (such as, for example, the directional arrows and the number pad "0" key, the keys "A", "W", "D", "X", and "S", or another group of five keys), five buttons on a cellular telephone, five keys displayed on a touch-screen (such as, for example, keys displayed on an iPad® mobile digital device from Apple, Inc. of California), five directions of a joystick and/or game controller, five fingers on a pressure or motion sensitive glove, five large and adequately spaced keys on a keypad attached to a device used in an environment where the user may be wearing bulky gloves (e.g. a factory worker or astronaut), etc. In these and other embodiments, the keys 202 are actuated by a user applying pressure, such as by pressing a button on a television remote controller. In other embodiments of the invention, the keys 202 can be actuated using, for example and not by way of limitation, eye tracking technology, oral or other noise communication, pressure-sensitive steering wheel and/or handle bar grips, motion activated gestures, foot pedals, heat sensitivity (e.g., of a body part) and so on.

One function of the five keys 202 can be to move a cursor to one of the cells 104, or to highlight one or more of the cells 104. In some embodiments a cursor is a distinct element displayed to assist highlighting a cell, although in some other embodiments the cursor as used herein is an abstract concept to describe which particular cell 104 is highlighted.

The term highlight as used herein does not necessarily mean that the highlighted cell is brightened in comparison to or otherwise distinguished from the unhighlighted cells, although in one embodiment comprising a display showing the user interface 100, a highlighted cell is brightened or otherwise distinguished. Instead, highlighted refers to a pre-entry or pre-selection state in which the symbol associated with a cell is one or more steps closer to entry or selection than the symbols associated with the unhighlighted cells. The terms active or activated are synonymous with the term highlighted when used with regard to a cell 104, although the term highlighted is used commonly herein in order to differentiate from other elements of embodiments of the invention. A highlighted cell is one on which the cursor is located, and the cursor is located on the highlighted cell. In one embodiment, the symbol associated with a highlighted cell is a single passive or active step away from entry or selection. Similar systems are described in U.S. Pat. No. 6,037,942 to Millington and entitled "Navigation System Character Input Device," U.S. Pat. No. 6,897,849 to Kim and entitled "Key Input Device and Character Input Method Using Directional Keys," and U.S. Pat. No. 7,084,858 to Anson and entitled "System and Method for Inputting Characters Using a Directional Pad," all three of which are fully incorporated by reference herein in their entirety.

If no cell 104 is highlighted (i.e., the cursor is not on any cell or is not present), the UI is said to be in neutral state, as shown in FIG. 1. If a cell is highlighted, then the user interface is said to be in a symbol selection mode, as shown in FIG. 3, where the cell 304 is highlighted.

As used herein, the term single-click comprises any type of single actuation, whether it is a physical actuation (such as clicking a button on a keyboard), an oral actuation, a visual actuation, or any other type of actuation. One embodiment of the present invention uses a single-click as the only type of actuation.

As used herein, the term double-click comprises two single actuations performed in quick succession on the same key or equivalent. Double-click time intervals, the time period within which a key must be actuated again after an initial actuation, can vary from device to device and user to user, and can be customizable. While one embodiment of the present invention uses the Microsoft Windows® default double-click time interval of 500 ms, other embodiments of the invention use a shorter double-click time interval. One reason for a shorter double-click time interval is that embodiments of the present invention can be used for typing, where the interval between selecting letters is already very short; the double-click time interval should therefore be shorter. In one embodiment, a double-click time interval is a period of time in the range of 50 ms to 1000 ms. In another embodiment, a double-click time interval is a period of time in the range of 50 ms to 700 ms. In yet another embodiment, a double-click time interval is in the range of 150 ms to 500 ms, with a preferred double-click time interval of 275 ms. Some embodiments of the present invention can recognize multiple-click data entries with more than two clicks, such as triple-clicks, quadruple-clicks, etc. Further, as opposed to applying pressure to a key for a certain period of time ("holding") can also serve as a type of actuation.

Figure 3:
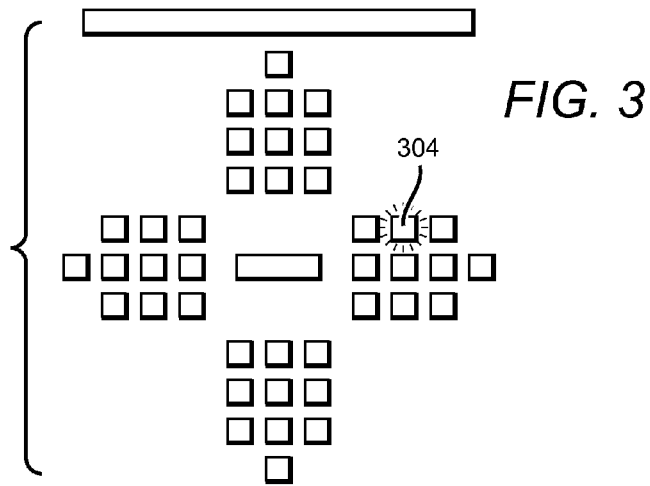
FIG. 3 is an embodiment of a user interface according to the present invention.

In one embodiment, a user can transfer from neutral state (as shown in FIG. 1) to symbol selection mode (an example of which is shown in FIG. 3) by, for example, actuating one of the directional keys 204. As discussed above, each of the matrices and directional keys 204 are associated with a single direction (up, down, left, or right), with each direction associated with a single matrix 102 and a single directional key 204. Thus, in this embodiment, there is a 1:1:1 association relationship between directions, matrices 102, and directional keys 204. Other embodiments may not include directions, and thus can simply have a 1:1 matrix to directional key association relationship. Other embodiments may not have a 1:1 association relationship.

In one embodiment, to move the cursor to one of the center cells 104a, thus highlighting this center cell, a user can single-click the directional key 204 associated with the matrix 102 in which the desired center cell 104a resides. For example, to highlight the center cell 104a in the matrix 102b, a user can single-click the directional key 204b. Once this action is complete, the user interface is in symbol selection mode and one of the matrices 102 is active (i.e., has a highlighted cell 104); in the example above, the matrix 102b becomes active. The directional keys 204 can then be used to move the cursor such that the appropriate cell 104 within the active matrix is highlighted. For example, to highlight the first subordinate cell 104c above the center cell 104a, a user could single-click the directional key 204b, which is associated with the direction "up." To highlight one of the second subordinate cells 104d, a user could single-click a combination of directional keys 204. For example, to select the subordinate cell 104d to the lower left of a center cell 104a after the center cell 104a is highlighted, a user could single-click the key 204a and single-click the key 204d, or a user could single-click the key 204d and single-click the key 204a. In another embodiment, a user could actuate a combination of directional keys 204 at the same time (e.g., in the example above, the user could single-click the keys 204a,204d simultaneously); in some such embodiments, the user can use, for example, more than one finger to actuate the keys.

In one embodiment, users may also transition from neutral state to symbol selection mode using an actuation other than a single-click. For example, in one embodiment a user could double-click a directional key 204 in order to highlight a cell other than a center cell 104a. In one such embodiment, double-clicking a directional key 204 highlights the end cell 104b in the matrix 102 associated with the double-clicked directional key 204. In this embodiment, the four center cells 104a and the four end cells 104b are all accessible using either one single-click or one double-click. In one specific embodiment, this creates the novel ability for the user to access eight of the nine most commonly used letters in the English language by actuating one of four direct ional keys (e.g., with either a single-click or a double-click).

Figure 4:
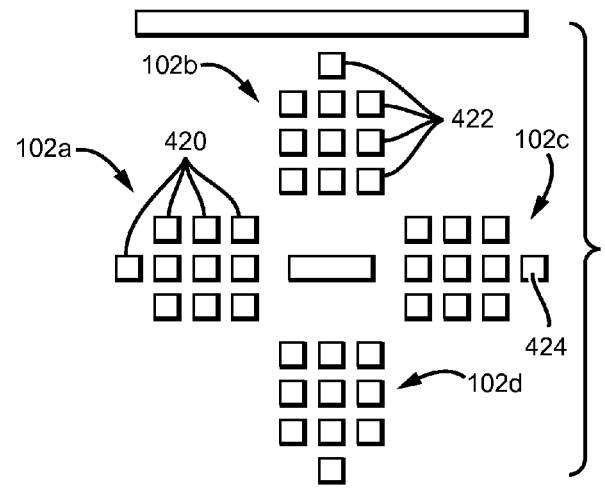
FIG. 4 is an embodiment of a user interface according to the present invention.

In one embodiment, users can change which matrix 102 is active using an actuation of the directional keys 204, such as a single-click. For example, if a cell on the outside of a matrix (e.g., in the 3×3+1 setup, any cell 104 other than a center cell 104a and the two cells 104c that are collinear with 104a and 104b) is highlighted, a user can switch the active matrix by actuating the directional key 204 associated with the direction in which there is no other cell within the active matrix. For example, if one of the cells 420 in FIG. 4 is highlighted and the directional key 204b associated with the up direction is actuated, the active matrix will switch from the matrix 102a to the matrix 102b. Similarly, if one of the cells 422 is highlighted, the user could actuate the directional key 204c (associated with the direction right) to switch the active matrix from the matrix 102b to the matrix 102c. Similarly, if the cell 424 is highlighted, the user could actuate the directional key 204b (associated with the direction up) to switch the active matrix to the matrix 102b, or actuate the directional key 204d (associated with the direction down) to switch the active matrix to the matrix 102d, or in one embodiment actuate the directional key 204c (associated with the direction right) to switch the active matrix to the matrix 102a (the opposite matrix). In another embodiment, a double-click of the directional key 204 associated with the direction adjacent to that of the active matrix switches the active matrix to the matrix 102 associated with the double-clicked directional key 204. For example, if the center cell 104a in matrix 102b were highlighted and a user double-clicked the directional key 204a, the active matrix would switch from the matrix 102b to the matrix 102a. In one embodiment, if one of the three inside cells 104c,104d adjacent to the word builder 108 in each of the matrices 102 is highlighted, a single-click to the inside (i.e., the direction opposite the direction with which the active matrix is associated) can return the UI 100 to neutral state.

In one embodiment, a double-click of the directional key 204 associated with the direction opposite that of the active matrix switches the active matrix to the matrix 102 associated with the double-clicked directional key 204. For example, if one of the cells 422 were highlighted and a user double-clicked the directional key 204d, the active matrix would switch from the matrix 102b to the matrix 102d.

Figure 5:
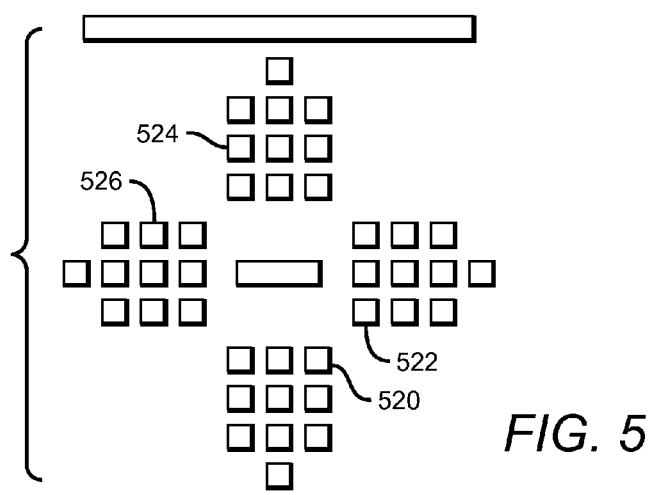
FIG. 5 is an embodiment of a user interface according to the present invention.

In different embodiments, a different cell in the newly active matrix is initially highlighted upon the matrix switch. In one embodiment, the center cell 104a of the newly active matrix becomes highlighted. In another embodiment, the center cell of the newly active matrix becomes highlighted unless the originally highlighted cell was an end cell 104b, in which case the end cell 104b of the newly active matrix becomes highlighted. In another embodiment, the mirror image cell of the newly active matrix is highlighted. For example, if the cell 520 in FIG. 5 were highlighted and the directional key 204c were actuated, the highlighted cell would switch to the cell 522. Similarly, if the cell 524 were highlighted and the directional key 204a were actuated, the cursor would switch to the cell 526.

In one embodiment of a UI incorporating elements of the present invention, the symbols 106 within an inactive matrix 102 can change based upon a user entry. For example, in one embodiment the symbols 106 within the matrix 102 opposite the matrix 102 in which a cell 104 was just highlighted can change to offer anticipated symbols related to the previously selected symbol. For example, if the letter "E" in the matrix 102a is highlighted, the symbols 106 in the matrix 102c can change such that the matrix 102c contains the symbols "ER", "ES", "EN", "ED", and "EE", which are all combinations of the highlighted symbol "E" with a second symbol that commonly follows the highlighted symbol. A user could then activate the matrix 102c by, for example, double-clicking the direction associated with the matrix 102c (right), which could highlight, for example, the center key 104a of the matrix 102c. This allows the user to easily select anticipated symbols containing two or more characters for faster input.

A cell 104 and/or associated symbol 106 can be entered or selected (used interchangeably herein) in a number of manners. In one embodiment, when a cell 104 and/or associated symbol 106 is entered or selected, the associated symbol 106 is entered into the word builder 108. In another embodiment, when a cell 104 and/or associated symbol 106 is entered or selected, the associated symbol is entered into the editor 110; one such embodiment does not include a word builder or can bypass the word builder, such as if the user configured the system to bypass the word builder.

In one embodiment, a highlighted cell 104 is entered after a time period of inactivity (i.e., a period without a user actuation), known herein as an inactivity selection period. The inactivity selection period should be longer than the double-click time interval described above; for example, if the double-click time interval is 275 ms, the inactivity selection period can be any period over 275 ms. No matter the double-click interval time, the inactivity selection period can be approximately equal to (and an infinitely small amount longer than) the double-click time interval. The inactivity selection period is typically in the range of 100 ms to 1500 ms, although shorter and longer periods are possible. In one embodiment, the inactivity selection period is 300 ms, or within 25 ms of the double-click interval time. In another embodiment, the inactivity selection period is about 1000 ms. In one embodiment, if the user does not wish to wait the duration of the inactivity selection period in order to select the highlighted cell/symbol, he or she may force the selection by actuating the entry key 206. In one embodiment, a backspace and/or an enter function (if present in a cell) cannot be selected due to inactivity, but instead must be affirmatively selected. In a further embodiment, the UI will not return to neutral state such that the backspace can be actuated multiple times in a row. This feature can be disengaged by actuation of a non-entry key, such as a directional key 204.

In an embodiment that does not include selection by an inactivity selection period, a selection is made using the entry key 206. When a user actuates the entry key 206, the highlighted cell is entered.

In one embodiment, after the selection of a symbol 106, the UI 100 returns to neutral state. In another embodiment, the highlighted cell 104 associated with the selected symbol 106 remains highlighted. In another embodiment, the highlighted cell 104 associated with the selected symbol 106 remains highlighted for a preset amount of time, such as, for example, a time equal to the inactivity selection period. If during this time the user actuates the entry key 206, the symbol 106 associated with the highlighted cell 104 is duplicated in the word builder 108 (e.g., allowing easy entry of the double "L" in the word "HELLO"). If no selection is made during this time period, then the UI 100 can return to neutral state.

In one embodiment of a UI incorporating elements of one or more embodiments of the present invention, a label on a cell 104 can indicate to a user that a certain type of actuation will select the labeled cell. A label could include, for example, an indicator in a corner of a cell 102 or a label in the background of a cell 102 behind the primary symbol 106. For example, the symbol ">>" in a cell 104 could indicate that a double-click of a key 204 associated with the direction right, such as the key 204c, would select the labeled cell. Alternatively, a cell 104 could be shaped to indicate to a user that a certain actuation can highlight the given cell; for example, while in neutral state, the end keys 104b could be displayed as diamonds indicating that a double-actuation of the associated directional key 204 would highlight the given end cell 104b. Likewise, a circle shape could indicate that a single-actuation could highlight the given cell, and so on.

The user interface 100 also includes an editor 110. In the embodiment shown, words that have been input into the word builder 108 can be transferred to the editor 110. For example, once a user is satisfied with the entries into the word builder 108, the user can enter an input to have the contents of the word builder 108 transferred to the editor 110. In one such embodiment, the contents of the word builder 108 are erased after they are entered into the editor 110, and the UI 100 returns to neutral state.

Different embodiments of the present invention can have one or more possible inputs to initiate this transfer, and can also perform additional functions in addition to this transfer. In some of these embodiments, the UI 100 can be in neutral state when the actuation is performed. In one embodiment, a single-click of the entry key 206 simply transfers the contents of the word builder 108 to the editor 110. In another embodiment, a single-click of the entry key 206 transfers the contents of the word builder 108 to the editor 110, and additionally adds a space in the editor after the transfer of the word builder 108 contents. In another embodiment, two single-clicks of the entry key 206 (entered in a timely manner so as not to trigger a double-click) will result in a transfer of the contents of the word builder 108, a period, and a space (or two spaces) after the period to the editor 110 so as to, for example, complete the end of a sentence and suggest the beginning of a new sentence, which in one embodiment can start with a capital letter. In a similar embodiment, a double-click of the entry key 206 is used instead of two single-clicks. In an embodiment that does not require an actuation of the entry key 206, one of the cells 104 is associated with an enter signal or an "enter" functional symbol; upon selecting this cell, the contents of the word builder 108 are transferred to the editor 110. This functionality can be especially useful when using an input device that uses a small number of keys such as four, or does not comprise an entry key.

One embodiment of the present invention includes a special feature in which a single word can be added to the editor 110 in an even faster manner. Upon entering a symbol into the word builder 108, the word that the user is most likely to be attempting to enter into the word builder 108 can flash in the word builder 108 for a period of time which can be preset and/or configurable, such as 900 ms or 1500 ms. A word that flashes in this manner will be referred to as the "flash word." In addition, the background color of the word builder 108 can change to alert the user to the presence of the word. The user can then choose to immediately select the flash word for entry into the editor 110 through an actuation such as, for example, single-clicking an entry key such as the entry key 206 while the flash word is displayed. Embodiments that flash a "flash sentence" are also possible.

The flash word can be chosen using an algorithm incorporating many different factors, including but not limited to word ranking or popularity. For example, when the user has input a letter in the word builder 108, the most commonly ranked word beginning with that letter in the appropriate language can be the flash word. In another example, if a user entered the symbols "R", "E", "S", "T", and "A" into the word builder, the algorithm may realize the likelihood that the user is attempting to enter the word "restaurant," and thus flash the word "restaurant" in the word builder 108 to make it available for immediate selection using any number of actuations including actuation of the entry key 206. In another embodiment, a database of popular words is used, and the first word in the database (as determined alphabetically) is the flash word. One embodiment of an algorithm that could be used in an embodiment of the present invention could determine not to display the highest ranked/popular word if that word has been previously selected, and thus choose to display the next highest ranked/popular word. The list of ranked words available can be easily configurable by the user or automatically configured by the system.

In other embodiments not comprising a word builder, symbols can be entered directly into the editor 110. In one such embodiment, a single-click of the entry key 206 when the UI 100 is in neutral state enters a space into the editor 110. In another embodiment two successive single-clicks of the entry key 206 when the UI 100 is in neutral state enters a period followed by a space (or two spaces) into the editor 110 to complete a sentence and suggest the beginning of a new sentence (which can start with a capital letter).

Once the desired symbols have been entered into the editor 110, various functions can be performed. Editor mode can be accessed in a number of ways, and the following embodiments are meant only as examples and are in no way limiting. In one embodiment, editor mode is activated from neutral state if the word builder 108 is empty and the entry key 206 is double-clicked. In another embodiment the editor can be activated if the user double-clicks the directional key 204b when any cell in the matrix 102b is active or if the user single-clicks the directional key 204b when the end key 104b in the matrix 102b is active. In List Mode (described below) the editor can be activated by double-clicking the directional key 204b when the first item in any list is selected. In another embodiment the editor can be activated entering an "editor" command in a number of utility menus.

Once in editor mode, various functions can be performed using the keys 202 and the contents of the editor 110. For example, a user can scroll within the contents of the editor, and/or then reenter neutral state and/or symbol selection mode to edit that particular section of the editor contents. From the editor command menu (not shown) the user can select what contents to edit (single character, entire word, sentence, paragraph, page), can select all, deselect all, invert the current selection, and mark selection (begin mark, end mark) to name a few. The user can then choose an action to perform on the selected contents such as find (starts with, ends with, contains, etc.), replace, delete, spell check, change capitalization (all caps, no caps, normal caps, title caps, proper caps, invert caps, etc.). The editor command menu can also control movement within the editor such as move to next/previous character, word, sentence, paragraph, page, etc. (using left/right arrow). A user could also perform functions with the edited text such as internet searching, text messaging, social networking, and emailing, to name a few.

Figure 6:
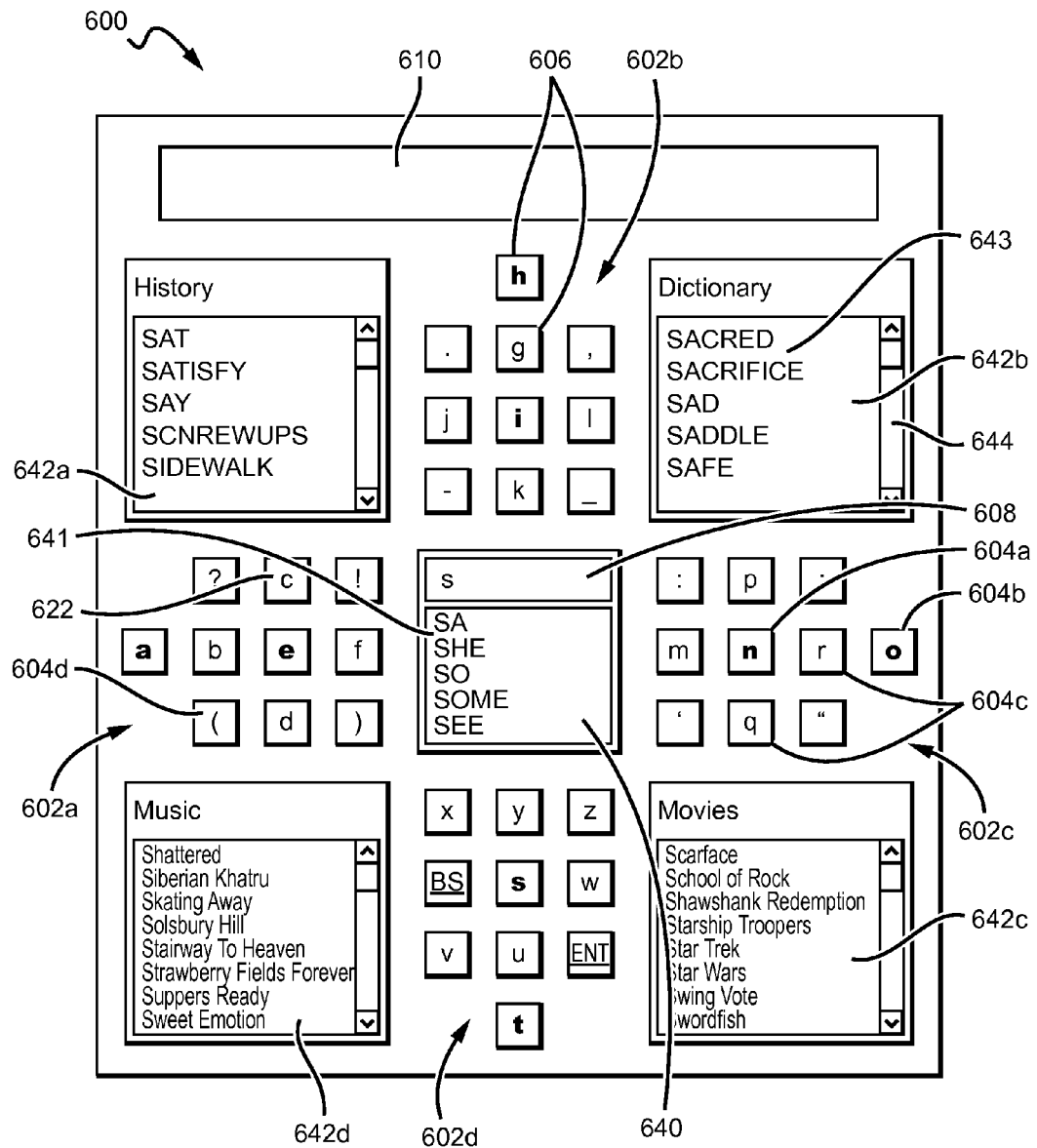
FIG. 6 is another embodiment of a user interface according to the present invention.
Figures 11, 12:
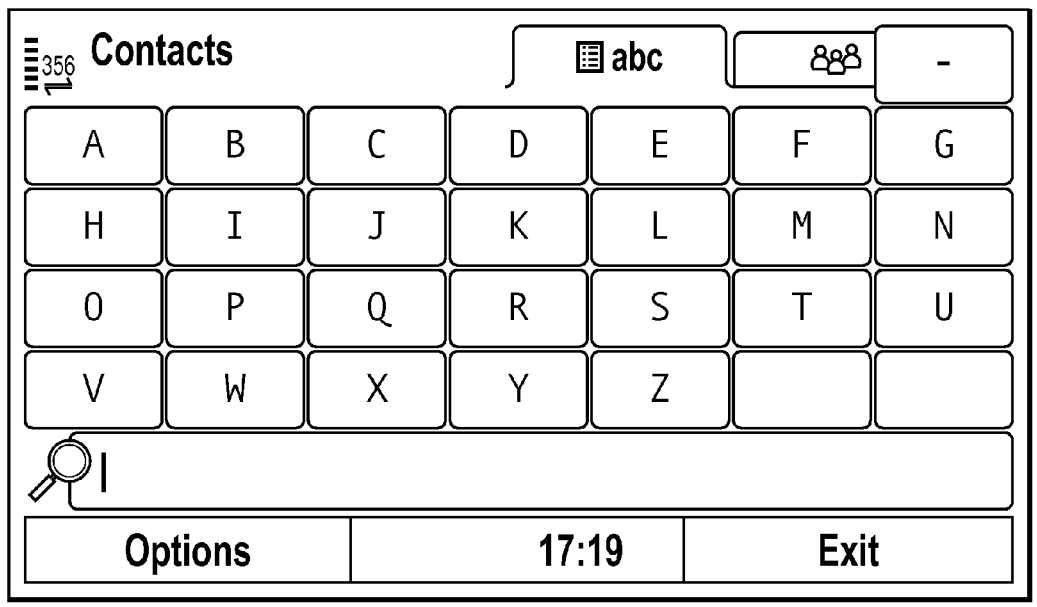
FIG. 11 is a prior art data entry user interface.
FIG. 12 is a chart showing letter frequency as a percentage according to one study.
Figure 13:
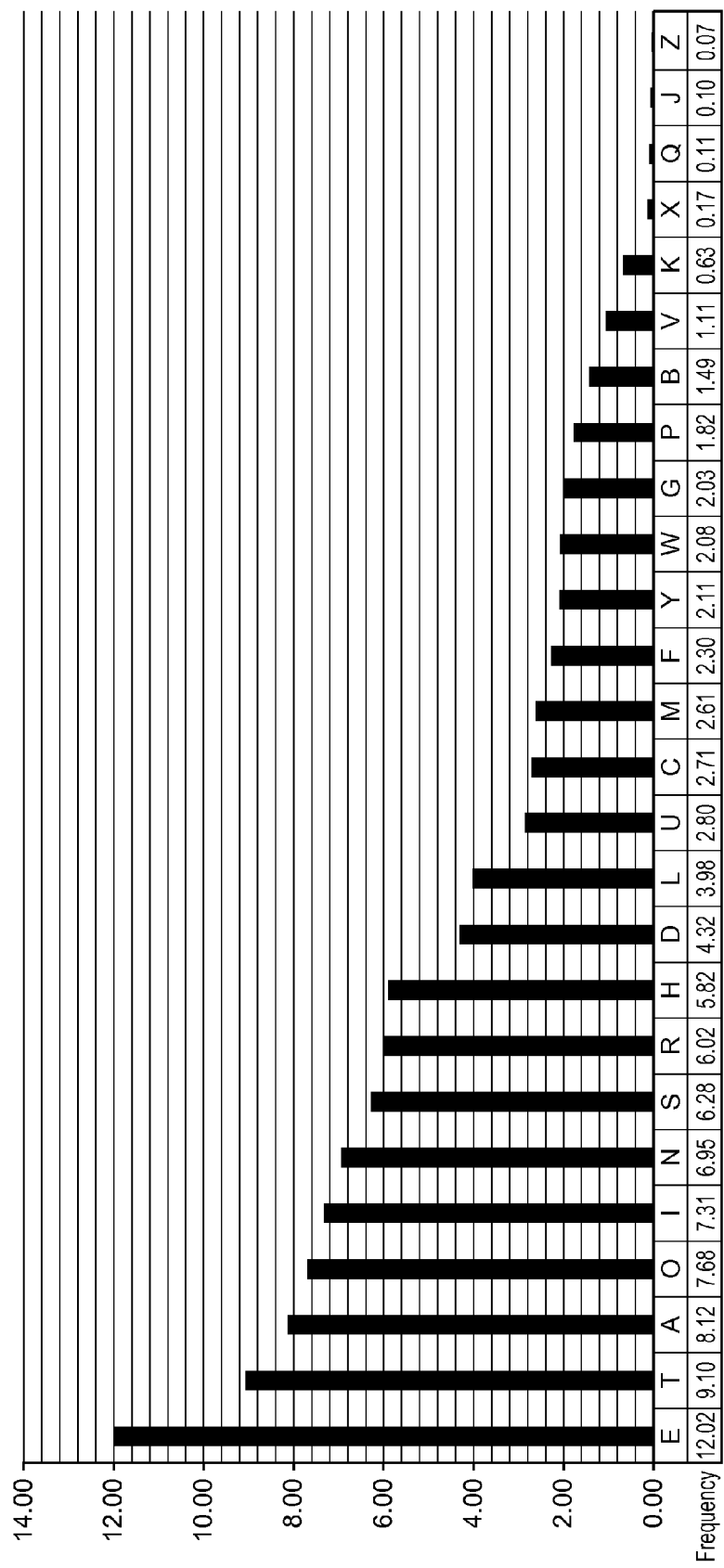
FIG. 13 is a bar graph of the data presented in FIG. 2

FIG. 6 is another embodiment of a UI 600 according to the present invention wherein each matrix is associated with a direction: matrix 602a with left, matrix 602b with up, matrix 602c with right, and matrix 602d with down. The UI 600 comprises some elements that are similar or equivalent to elements of the UI 100 from FIG. 1. For example, the UI comprises matrices 602, cells 604, symbols 606 within the cells 604, a word builder 608, and an editor 610.

The embodiment shown in FIG. 6 shows one embodiment of a specific organization of symbols 606 that, when combined with the methods, devices, and systems described herein, allows for easy, fast, and understandable use by a user. In the embodiment shown, the letters "e", "i", "n", and "s" occupy the center cells 604a, and the letters "a", "h", "o", and "t" occupy the end cells 604b. Using one or more of the actuation methods previously described, these eight letters are available for highlighting from neutral state by a single actuation: either a single-click or a double-click of one of the directional keys 204. In the UI 600, the eight cells 604a,604b that are able to be highlighted using a single actuation from neutral state are associated with eight of the nine most common letters of the English alphabet, including the seven most common letters. Further, the grouping of symbols 606 in each matrix 602 is alphabetical (although some embodiments are not alphabetical; for example, embodiments can be based solely on usage frequency of symbols). The letters "a" through "f" occupy six cells in the matrix 602a; the letters "g" through "l" occupy six cells in the matrix 602b; the letters "m" through "r" occupy six cells in the matrix 602c; and the letters "s" through "z" occupy eight cells in the matrix 602d.

While the organization shown in FIG. 6 follows the clockwise order matrix 602a-matrix 602b-matrix 602c-matrix 602d, other organizations can have a different order, as the matrices can be ranked in order of desirability, similar to the ranking described in U.S. Pat. No. 7,084,858. For example, if an alphabetical organization is used, it could begin with another matrix and follow a clockwise order, such as matrix 602b-matrix 602c-matrix 602d-matrix 602a. An alternative order is matrix 602b-matrix 602a-matrix 602c-matrix 602d. Many different orders and rankings are possible.

The UI 600 is organized such that all but three letters of the English language occupy the cells 104a,104b,104c; this is because in the embodiment shown, the cells 104a and 104b are ranked higher than the cells 104c, and the cells 104c are ranked higher than the cells 104d. In the specific embodiment shown, one of the cells 104c is occupied by a "backspace" functional symbol, because in this particular embodiment a "backspace" functional symbol is more common and/or desirable than the letter "v".

In another embodiment of a UI according to the present invention, all of the cells 104a,104b,104c can be occupied by letters. In another embodiment, the center cells and end cells 104a,104b can be occupied by the eight most common symbols, or the eight most common letters. In another embodiment of a UI according to the present invention, a "space" symbol can be included in one of the cells 102.

In an embodiment like that of the UI 600 where the "space" symbol is not included, the "space" functionality can be included in the system through use of a key, such as the entry key 206. For example, if a UI is in neutral state without any symbols in a word builder, a single-click of a key such as the entry key 206 could enter a space into the editor or, alternatively, into the word builder. This embodiment is particularly advantageous since the "space" can be more desirable than any other symbol. Since in one embodiment the entry key 206 is arguably the easiest of the five keys 202 to actuate (being in the center of the group of five keys), it can be associated with the most commonly used symbol—in one embodiment, the "space." In one embodiment, the unique tri-functionality of the entry key 206 (as a symbol accept key, as a word builder-to-editor key, and as the space key) improve the efficiency and ease of use of embodiments of the present invention over that of the prior art.

Some embodiments of user interfaces according to the present invention comprise more elements than the UI 100. For example, the embodiment of FIG. 6 comprises a result list 640 and four subject or corner lists 642. Each of these lists can be responsive to the contents of the word builder 608 and/or the editor 610.

In one embodiment, the result list 640 is responsive to the contents of the word builder 608. For example and as shown in FIG. 6, if the letter "s" is entered into the word builder 608, the result list 640 populates with contents 641 that are words beginning with "s"; in one embodiment, the contents 641 are the five most commonly used or highest ranked words in a language, such as English. The contents 641 of the result list 640 are not limited strictly to words, but can include any combination of one or more symbols 606. Further, while the contents 641 include five combinations of symbols, more than or fewer than five results are possible. These lists can be customizable by the user to contain the preferred list of words or symbols for a given task, or can be automatically defined by the system.

The result list 640 can be populated with contents 641 in many different manners. In one embodiment, user history is utilized to determine the combinations of symbols 606 that the user is the most likely to enter based on the current contents of the word builder 640. For example, in FIG. 6, after the symbol "S" is entered into the word builder 608, the result list 640 populates with contents 641 including the words "say", "she", "so", "some", and "see". In one embodiment, an algorithm based on user history determined that these were the five symbol combinations the user is most likely to want to eventually enter into the editor 610 (in embodiments comprising an editor).

In another embodiment, after the entry of a first symbol, the result list is populated with the five highest ranked words beginning with that symbol. After the entry of a second or subsequent symbol, the result list uses a database of popular words, and lists in alphabetical order the five words from the database beginning with the entered symbols.

The contents 641 of the result list 640 can originate from a dynamic list, meaning that the list of possible results can change over time. In this case, the results can change based on user input; for example, a word could be added to the dynamic list if a user input a new word, or a word could become more likely to be selected by the algorithm based on a user inputting that word frequently.

In one embodiment, if a user wishes to select a symbol combination or list of words from the contents 641 of the result list 640, he or she may want to enter list mode, with the result list 640 being the default active list. To access the contents 641 of the result list 640, a user could in one embodiment double-click the entry key 206. In one embodiment the result list 640 contains exactly five items.

In one embodiment, when the result list 640 is activated the third item of the list would be the highlighted or active item. That item would then be selectable and entered into the editor by a single-click of the entry key 206 or, in another embodiment, after the inactivity selection period. The benefit of this arrangement is that if the center item of the result list is not the desired item of entry then any of the other four items in the list can be selectable by one additional click of either of the four directional buttons 204. Once selected, the item would then be added to the editor by a single-click of the entry key 206. In this embodiment the first visible item at the top of the list would be selected by entry of the key 204a (left key jumps to top), the fifth visible item in the list would be selected by entry of the key 204c (right key jumps to bottom), the second visible item of the list would be selected by entry of the key 204b (up key scrolls up one list item), and the fourth visible item in the list would be selected by entry of the key 204d (down key scrolls down one list item). The relationship of the number of items (five) in the result list and the number of directional keys (four) of the system combined with the middle item being initially activated allows efficient and direct selection of any of the five items in the result list 640 by no more than one directional key click without the need for continuous scrolling. Since the result list 640 can contain the five most common words beginning with the letters within the word builder 608, this method provides the direct and immediate access to those common words without the need to spell them out entirely providing for a simple, efficient, and quick mode of text entry. It should be noted that the above associations of keys and list items is merely exemplary, as many different association combinations are possible.

In another embodiment, a user can utilize the directional keys 204. In one embodiment, one of the directional keys 204 scrolls up within the content 641, one of the directional keys 204 scrolls down within the content 641, one of the directional keys 204 jumps to the first entry of the content 641, and one of the directional keys 204 jumps to the last entry of the content 641. For example, in one embodiment the directional key 204a jumps to the first entry of the content 641, the directional key 204b scrolls up, the directional key 204c jumps to the bottom entry of the content 641, and the directional key 204d scrolls down. In embodiments utilizing a scroll bar, a double-click of one of the directional keys 204 such as the directional key 204a and the directional key 204c could jump such that the top or bottom entry of the contents 641, respectively, becomes highlighted.

In the embodiment shown, the result list content 641 is limited to five entries, although fewer than or more than five entries are possible. In the embodiment shown the result list 640 does not include a scrollbar since in this embodiment the contents 641 of the result list 640 are limited to five results, but in other embodiments the result list 640 can include such a function.

Typically an entry key, such as the entry key 206, can be used to select a highlighted entry within the result list. For example, in one embodiment a single-click moves the combination of symbols to a word builder, while a double-click moves the combination of symbols to an editor. In another embodiment a single-click of an entry key moves the result directly to an editor. In another embodiment, a result in the result list 640 is selected using an inactivity selection period.

Some user interfaces, such as the UI 600, also include one or more content or corner lists 642. One of the corner lists 642 can be activated in a number of manners. First, as discussed with regard to switching active matrices a user can activate the lists if, while a cell 604 is adjacent to a list 642 as opposed to another cell 604, by actuating the directional key 204 associated with the direction in which the corner list 642 lies. For example, if the cell 622 is highlighted, in one embodiment a user can activate the corner list 642a by actuating a directional key associated with up, such as the directional key 204b. In another embodiment the corner list 642a can be accessed when the result list 640 is active by double-clicking the directional key 204a (left) and the corner list 642b can be accessed when the result list 640 is active by double-clicking the directional key 204c (right).

In one embodiment, selections within the corner lists 642 can be made in much the same way as selections within the results list 640. In a similar embodiment, since corner lists can contain many items (much more than the preferred five items in the result list 640) the ability to scroll becomes necessary. In one such embodiment, the ability to quickly scroll through the corner lists 642 can be achieved by double-clicking one of the four directional keys 204. In one embodiment the user can scroll to the last item in a list (not necessarily the last visible item) by double-clicking the key 204c, scroll to the first item in a list by double-clicking the key 204a, scroll down in a page-down manner by double-clicking the key 205d, and scroll up in a page-up manner by double-clicking the key 205b. The functionalities of the keys described above is purely exemplary, as many different functionalities are possible.

The contents 643 of the corner lists 642 can vary from embodiment to embodiment. One type of corner list includes non-traditional words based on the contents of the word builder or editor, such as contractions, proper nouns, abbreviations, slang, etc. The corner lists 642 can comprise scrollbars 644, meaning that the lists are not necessarily limited in the number of entries that are visible within the corner lists 642. In many embodiments, the lists are populated using an algorithm the same as or similar to that of the results list 640; that is to say, contents 643 are populated based upon the most likely user selections based on the contents of the word builder 608. In the UI 600, the corner lists 642 comprise a History list 642a, a Dictionary list 642b, a Movies list 642c, and a Music list 642d. In one embodiment, the number and type of lists is unlimited and configurable. The user could create lists for Broadway plays, photos, football teams, contacts, events, etc. and choose which lists to display as corner lists depending on the task at hand.

These lists can be static, dynamic, or a combination thereof. For example, the History list 642a can be dynamic and have contents based upon the last fifty entries. In another embodiment, one or more files (in one embodiment, 26 files: one for words beginning with each letter of the alphabet; another embodiment includes a 27th file for all entries beginning with non-letter symbols) keep a history of every word previously entered into the UI 100 such that these entries are accessible through the History list 642a. The Dictionary list 642b can be static and based on a given dictionary (although in one embodiment static lists can be updated). The Movies and Music lists 642c,642d can, for example, be dynamic in that the possible contents can be updated, but can be static in that they always use contents from the same location (e.g., a folder in a computer titled "Movies") to populate. Alternatively, lists such as the Movies and Music lists 642c,642d could search the content of a device utilizing the UI 600, such as a computer, for a certain file type.

While the above embodiments have included four matrices 102 each containing ten cells 104, many other layouts and accompanying functionalities and actuations are possible. One embodiment of such a UI, the UI 700 shown in FIG. 7, includes four inner matrices 702 and four outer matrices 703. In the embodiment shown, a user can, for example, access a cell in an inner matrix 702 by single-clicking the directional key associated with that matrix, and can access a cell in an outer matrix 703 by double-clicking a directional key. Navigation between matrices can be performed using the functionalities and actuations previously described. While the matrices 702,703 each comprises five cells 104, matrices comprising more cells are possible. This double-matrix layout can allow access to a large number of symbols and/or functions.

Embodiments of the present invention can also simulate mouse behavior. In one embodiment mouse commands can be functional symbols 106 within the cells 104 (e.g., "click" or "right click"). In a preferred embodiment, mouse commands can be input using a menu. One embodiment of such a menu is the puck menu 800 shown in FIG. 8. The puck menu 800 includes four quadrants 802a,802b,802c,802d. Three of the quadrants (in this case, the quadrants 802b, 802c,802d) can contain scrollable submenus 804 containing command items. In the puck menu 800, the quadrants 802b,802d contain typical mouse commands, while the quadrant 802c is a functional command quadrant that switches functionalities.

A plurality of keys, such as the key layout 200, can be used as an input device with the puck menu 800. In the embodiment of the puck menu 800, the left quadrant 802a serves as a quadrant selector. An indicator 803, in the embodiment shown an arrow pointing to one of the quadrants 802b,802d, indicates which of the quadrants 802b, 802d will be selected by actuating a key associated with the quadrant 802a. In the case where the key layout 200 is used as an input device, the directional key 204a is associated with the quadrant 802a. When the directional key 204a is actuated, whichever of the quadrants 802b,802d is indicated by the indicator 703 upon actuation becomes active. A user can activate the quadrant 802c by actuating the directional key associated with the quadrant 802c, in this case the directional key 204c.

Once one of the quadrants 802b,802c,802d is activated, a user can highlight one of the commands in the activated submenu 804 by scrolling through the submenus 804 using the two directional keys 204 not used to activate a quadrant 802; in this case, the directional keys 204b,204d associated with the directions up and down. When the desired command is highlighted, a user can select the highlighted command by actuating an entry key such as the entry key 206.

The functional quadrant 802c can contain many different functional commands in different embodiments. In one embodiment of a UI according to the present invention, the puck menu 800 is shown on the same display as the UI 600. A "move" command can allow a user to move the puck menu 800 in relation to the UI 600. A "keypad" command could hide the puck menu 800 such that only the UI 600 was displayed. A "mouse" command could put the system into mouse mode, which will be described below. In another embodiment, the puck menu 800 is the only menu displayed on the UI, and selecting a command such as "keypad" can change the UI such that it displays only a UI such as the UI 600. In another embodiment a "mouse" command could change to mouse mode as well as convert the UI.

A "change menu" command could change which menus are displayed in the upper quadrant 802b and/or the lower quadrant 802d. For example, a user could change one of the quadrants 802b,802d to display email commands if he or she wished to have email functionality. In one embodiment, a "change menu" command changes one of the submenus to display a list of possible menus; when one of these menus is selected that submenu changes to include the commands associated with that menu. As an example of this functionality, in FIG. 9A the quadrant 902c shows a command "mTop", equivalent to a command to change the contents of the top menu 904b. Upon selecting this command, the contents of the top menu 904b are changed to display a list of possible menus for selection by a user as shown in FIG. 9B. Upon selecting one of these options, the contents of the menu change to include commands related to the selection; in the case of FIGS. 9B and 9C, the command "Email" from FIG. 9B was selected such that the menu displayed in the quadrant 904b in FIG. 9C shows email commands. Any number of menus is possible. Upon changing one of the submenus in a quadrant, that quadrant can become active.

One embodiment of the present invention can utilize an input device, such as a device comprising the five keys 202 of FIG. 2, to easily and efficiently build custom lists which can, for example, be used as a result or corner list. For example, a custom list such as "legal terms" can be easily created and manipulated. A user can choose any number of known methods, such as scanning a computer or the internet for legal terms. This glossary could be divided into different files, for example, files beginning with each letter of the alphabet.

The system can then display the identified terms in a list builder. A list builder matrix 1000 comprising nine submatrices 1002, each containing five words 1004, and a command matrix 1006 is shown in FIG. 10. List builder matrices containing many different numbers of submatrices 1002 and words 1004 per submatrix are possible. The words 1004 in each submatrix 1002 can be organized, for example, alphabetically or based on the number of characters per word.

In the embodiment of FIG. 10, the list builder matrix 1000 is in "remove" mode, meaning that by default the words 1004 will be added to a new list unless selected. An "add" mode, where a user must select which words 1004 to add to the new list, is also possible. The default initial highlighted upon entry into list builder mode can vary; in one embodiment, the middle word 1004a of the submatrix 1002a is highlighted by default. Navigation within a submatrix can be performed using the methods previously described with the result list. Navigation between matrices can, for example, be performed by double-clicking in the direction of the adjacent desired submatrix; for example, if the submatrix 1002a were highlighted, a user could double-click a right directional key to access the submatrix 1002b, a down directional key to access the submatrix 1002c, or an up directional key to access the command matrix 1006. Within the command matrix 1006, if source content contained more words than could fit in submatrices 1002, "previous page" and/or "next page" cells within the command matrix could be highlighted and selected to repopulate the submatrices. A save command can enable creation and/or modification of the custom list.

In one embodiment of the present invention, keys such as the keys in the key layout 200 can be used in a manner similar to that of a mouse. Mouse mode can be activated in any number of ways, including selecting a "mouse" command from a menu in a UI similar to the UI 600 or a menu similar to the puck menu 800. In another embodiment, mouse mode can be automatically activated upon a user selecting an option which would typically require, or be convenient to use with, mouse mode. When activated, mouse mode allows the user to change the position of a pointer by selecting one or more keys, such as the directional keys 204, such that the pointer moves in an associated direction. In one embodiment, the speed of pointer movement can vary based upon the type of actuation or number of actuations performed on a key. For example, a single-click of the directional key 204c could cause the pointer to move to the right at a "slow" speed, such as, for example, 100 pixels per second. Another single-click of the key 204c could increase the speed to a "moderate" speed, such as 200 pixels per second, and so on. In one embodiment, another actuation of the same key may cause the speed to return to "slow" or pause pointer movement. In one embodiment, actuating a key, such as the entry key 206, halts pointer movement.

A change of pointer movement direction can be initiated by actuating a directional key 204 associated with a direction other than the direction in which the pointer is moving. In one embodiment, actuating such a directional key 204 causes the pointer to move in the direction of the actuated key 204. In another embodiment, actuating such a directional key 204 causes the pointer to move in a direction between the previous direction of movement and the actuated key 204. As an example, if the pointer were moving to the right and a user actuated the key 204b (associated with the direction "up"), the pointer could move at an angle of 45° between the directions "right" and "up". This angle can change based on system settings or user preference; for example, the actuation described above could change the angle of movement by 30° instead of 45°; an additional actuation could change the angle by an additional 30°, and so on.

In one embodiment, if a user actuates a directional key 204 associated with a direction opposite that of the pointer movement, the pointer begins moving in the actuated direction. In another embodiment, pointer movement stops. In yet another embodiment, pointer movement continues in the same direction, but slows. As an example, if the pointer is moving to the right at 300 pixels per second and a user actuates the key 204a, the pointer could slow to 200 pixels per second movement to the right.

It is understood that embodiments presented herein are meant to be exemplary. Embodiments of the present invention can comprise any combination of compatible features shown in the various figures, and these embodiments should not be limited to those expressly illustrated and discussed. Although the present invention has been described in detail with reference to certain preferred configurations thereof, other versions are possible. Therefore, the spirit and scope of the invention should not be limited to the versions described above. Further, while specific embodiments are described above, methods, devices, and systems according to embodiments of the present invention can be customizable (e.g., a user can specify, for example, an appropriate time period for a double-click time interval).

I claim:

1. A data entry method for activating one of a plurality of cells from a neutral state wherein none of said cells is activated, said method comprising:
   receiving a first user input comprising a single-actuation or double-actuation of one of four keys; and
   activating one of a plurality of cells from a neutral state in response to said first user input, said plurality of cells comprising four first cells, four second cells, and a plurality of subordinate cells;
   wherein each of said four keys, first cells, and second cells is associated in a 1:1:1 relationship;
   wherein said first user input activates one of said first cells or one of said second cells; and
   wherein each of said first cells and each of said second cells is associated with one of a group of nine letters in a 1:1 relationship, said group of nine letters consisting of "e", "t", "a", "o", "i", "n", "s", "r", and "h".

2. The method of claim 1, further comprising adding a symbol associated with said activated cell to a word builder.

3. The method of claim 2, wherein said symbol is added to said word builder upon receipt of a second user input;
   wherein said second user input is an actuation of a fifth key.

4. The method of claim 2, wherein said associated symbol is automatically added to said word builder after an inactivity selection period.

5. The method of claim 1, further comprising displaying said plurality of matrices.

6. The method of claim 1, wherein said plurality of matrices consists of four or fewer matrices.

7. The method of claim 1, wherein each of said matrices is associated with one or more of said subordinate cells.

8. The method of claim 1, further comprising adding the contents of a word builder to an editor upon receipt of a second user input.

9. The method of claim 8, further comprising erasing the contents of said word builder upon receipt of said second user input.

10. The method of claim 1, wherein said single-actuation comprises a single-click or single-tap; and
    wherein said double-actuation comprises a double-click or double-tap.

11. The method of claim 1, further comprising displaying said plurality of cells in four 3×3+1 matrices, wherein each of said matrices comprises a center cell and an end cell; and
    wherein each of said first cells is a center cell and each of said second cells is an end cell.

12. The method of claim 1, wherein said plurality of keys consists of five or fewer keys.

13. The method of claim 1, wherein a single-actuation from said neutral state activates one of said first cells and a double-actuation from said neutral state activates one of said second cells, and two single-actuations from said neutral state activates one of said subordinate cells.

14. The method of claim 2, further comprising returning to said neutral state upon said symbol being added to said word builder.

15. The method of claim 9, further comprising adding a space after said contents in said editor upon receipt of said second user input.

16. The method of claim 1, wherein an single-actuation of any one of said keys activates its associated first cell and a double-actuation of any one of said keys activates its associated second cell;
    wherein each of said first cells is associated with one of a group of four letters consisting of "e", "i", "n", and "s" or one of a group of five letters consisting of "a", "h", "o", "t", and "r".

17. The method of claim 16, wherein each of said second cells is associated with one of the other of said group of four letters and said group of five letters.

18. The method of claim 16, wherein each of said first cells is associated with one of said group of four letters, and wherein each of said second cells is associated with one of said group of five letters.

19. A system for accepting data entry to active one of a plurality of cells from a neutral state wherein none of said cells is activated, said system comprising:
- a data entry device comprising four keys; and
- a processor for receiving data entered using said data entry device;
- wherein each of said four keys is associated with a first cell and a second cell in a 1:1:1 relationship, and is associated with a plurality of subordinate cells;
- wherein from a neutral state, a single-actuation of one of said keys is configured to activate its associated first cell;
- wherein from a neutral state, a double-actuation of one of said keys is configured to active its associated second cell;
- wherein from a neutral state, two single-actuations of one of said keys is configured to activate one of its associated subordinate cells;
- wherein each of said first cells and each of said second cells is associated with one of a group of nine letters in a 1:1 relationship, said group of nine letters consisting of "e", "t", "a", "o", "i", "n", "s", "r", and "h".

20. A data entry system for the entry of symbols, comprising:
- a data entry device comprising four keys; and
- a user interface comprising more a plurality of cells, wherein each of said cells is associated with a symbol available for user selection;
- wherein eight of said cells can be activated from a neutral state by one single-actuation or one double-actuation of one of said four keys; and
- wherein the twenty-eight others of said cells can be activated from a neutral state by multiple single-actuations and/or double-actuations of one of said four keys; and
- wherein from a neutral state, two single-actuations of a first of said four keys activates a different cell than one single-actuation or one double-actuation of said first key; and
- wherein each of said eight of said cells is associated with one of a group of nine letters in a 1:1 relationship, said group of nine letters consisting of "e", "t", "a", "o", "i", "n", "s", "r", and "h".

21. The data entry system of claim 20, wherein four of said keys are directional keys;
- wherein said eight symbols can be selected by a single-actuation or a double-actuation of one of four of said keys.

22. The data entry system of claim 20, comprising forty or more cells.

* * * * *